United States Patent
Kuboyama et al.

(10) Patent No.: US 7,711,559 B2
(45) Date of Patent: May 4, 2010

(54) SPEECH RECOGNITION APPARATUS AND METHOD

(75) Inventors: Hideo Kuboyama, Yokohama (JP); Hiroki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 11/610,017

(22) Filed: Dec. 13, 2006

(65) Prior Publication Data

US 2007/0136061 A1 Jun. 14, 2007

(30) Foreign Application Priority Data

Dec. 14, 2005 (JP) ............................. 2005-360838

(51) Int. Cl.
*G10L 15/00* (2006.01)
(52) U.S. Cl. .................. 704/251; 704/256; 704/257
(58) Field of Classification Search ................ 704/251, 704/256, 257
See application file for complete search history.

(56) References Cited

U.S. PATENT DOCUMENTS

| | | | |
|---|---|---|---|
| 5,946,655 A | 8/1999 | Steinbiss et al. | |
| 5,956,679 A | 9/1999 | Komori et al. | 704/256 |
| 5,970,445 A | 10/1999 | Yamamoto et al. | 704/230 |
| 6,587,820 B2 | 7/2003 | Kosaka et al. | 704/257 |
| 6,801,892 B2 | 10/2004 | Yamamoto | 704/256 |
| 6,963,837 B1 * | 11/2005 | Finke et al. | 704/256 |
| 6,980,954 B1 * | 12/2005 | Zhao et al. | 704/251 |
| 7,024,361 B2 | 4/2006 | Kosaka et al. | 704/257 |
| 2003/0220793 A1 | 11/2003 | Kosaka et al. | 704/270 |
| 2004/0153312 A1 | 8/2004 | Yamamoto | 704/10 |
| 2005/0086057 A1 | 4/2005 | Kosaka et al. | 704/251 |
| 2008/0255839 A1 * | 10/2008 | Larri et al. | 704/238 |

FOREIGN PATENT DOCUMENTS

| | | |
|---|---|---|
| JP | 7-295587 | 11/1995 |
| JP | 2003-236673 | 8/2003 |
| JP | 2004-2867 | 1/2004 |
| JP | 2005-131686 | 5/2005 |

\* cited by examiner

*Primary Examiner*—Daniel D Abebe
(74) *Attorney, Agent, or Firm*—Fitzpatrick, Cella, Harper & Scinto

(57) ABSTRACT

A speech recognition apparatus that requires a reduced amount of computation for likelihood calculation is provided. A language lookahead score for a node of interest is generated based on the language scores for each recognition word shared by the node of interest. To this is added the node's acoustic score, which is calculated based on the likelihood of the connected hypotheses expressed by a path from the root node to the parent node of the node of interest. From this added result, the language lookahead score resulting when the parent node is the node of interest is deleted, and the language lookahead score is updated by adding the language lookahead score of the node of interest. The updating of the language lookahead score is terminated at a specific position in the tree structure.

6 Claims, 9 Drawing Sheets

LANGUAGE SCORES ARE ASSIGNED AT EACH HYPOTHESIS OF THE START OF WORDS.

IT IS UNKNOWN WHICH WORD'S LANGUAGE SCORE TO ASSIGN.

SPEECH RECOGNITION APPARATUS AND METHOD

BACKGROUND OF THE INVENTION

1. Field of the Invention

The present invention relates to a technique for speech recognition.

2. Description of the Related Art

In speech recognition, there is known a method of calculating a likelihood of recognition words by sharing partial hypotheses of recognition words capable of being shared, generating a tree structured hypothesis, and searching. According to this method, likelihood calculation can be carried out rapidly by sharing hypotheses using a plurality of recognition words, thereby reducing the number of times likelihood calculations and searches are carried out.

At times, there is added to likelihood calculation the language score that represents the ease by which words can be connected to each other and the ease by which words appear. By adopting language scores, e.g., word list candidates that cannot be connected can be effectively deleted, and the accuracy and speed of recognition can be increased.

However, the said tree structured hypothesis has as a problem of the inability to apply language scores at the start of a word. This problem will be described with reference to FIGS. 7A and 7B. FIG. 7A is an example of a hypothesis that is generated per word, while FIG. 7B is an example of a tree structured hypothesis that is shared between a plurality of words. With reference to FIG. 7A, the "a" in a reference number 601, e.g., is a hypothesis that corresponds to a phoneme that makes up a word. In FIG. 7B, "a" is a node of the tree structured hypothesis. A hypothesis 601 is often made up of a plurality of condition hypotheses generated by the HMM (Hidden Malkov Model). Here, in FIG. 7A, because the words are uniquely determined depending on the former hypothesis, the corresponding language score emerging from the former hypothesis can be added to the likelihood calculation. By contrast, in FIG. 7B, since the hypothesis is shared by a plurality of words, it cannot be determined which word's language score should be applied. Consequently, a language score cannot be applied until the hypothesis uniquely determining-words can be determined. In such a case, a hypothesis whose language score is extremely low and which would be deleted under normal circumstances would result in the likelihood calculation up to the point of language score application to be wasted because the language score would not be able to be applied until the hypothesis is no longer shared.

In order to solve this problem, in U.S. Pat. No. 5,946,655 (Japanese Patent Laid-Open No. 7-295587), for each hypothesis, a correction value is applied so that between the words that share the hypothesis, the largest language score is applied to the likelihood. This is shown in FIG. 8. In this diagram, for each hypothesis, a correction score is applied so that, between the words that share the hypothesis, the largest language score is taken as the language lookahead score, which is added to the likelihood. For example, in this diagram, the lead node "h" is assigned a correction score of A, the child node "a" is assigned a correction score of 0, and the child node "e" is assigned a correction score of (D-A). In this way, at the time of likelihood calculation, by adding correction scores at each hypothesis, the likelihood lookahead score shown in the diagram is added to the likelihood. Then, the total correction score sum (i.e., the language lookahead score at the hypothesis of the end of the word) is subtracted at the end of the word, and the correct language score is added. In this way, it is possible to add a language lookahead score to a hypothesis that is shared by multiple words, or to a hypothesis of the lead word, and so efficiency is increased by being able to delete hypothesis at the beginning of a word if the language lookahead score is low.

However, according to the method of U.S. Pat. No. 5,946,655, a correction score is applied at each hypothesis of the tree structure dictionary, and the language score is again added after subtracting the correction score at the end of the word. Thus, there is a problem of increased amount of computation required for updating the language score.

Therefore, in order to enable fast speech recognition, it is desirable to abbreviate, to some extent, the updating of the said language lookahead score, and to be able to add the language lookahead score to the likelihood calculation from the start of the word.

SUMMARY OF THE INVENTION

According to the present invention, the foregoing object is attained by providing a speech recognition apparatus using a tree structured hypothesis having nodes each corresponding to a part of a recognition word, the apparatus adapted to calculate a likelihood of connected hypotheses expressed by a pass from a root node to a node of interest using acoustic and language scores, comprising:

a language lookahead score generating unit configured to generate a language lookahead score for a node of interest based on the language-score of each recognition word sharing the node of interest;

an addition unit configured to add the acoustic score of the node of interest to the likelihood of connected hypotheses expressed by a path from the root node to a parent node of the node of interest;

an updating unit configured to update the language lookahead score by deleting the language lookahead score when the parent node was the node of interest, and by adding the language lookahead score of the node of interest generated by the language lookahead score generating unit; and an updating interrupt unit configured to interrupt the updating of the language lookahead score by the updating unit, in accordance with the position of the node of interest in the tree structured hypothesis.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

Figure 1A:
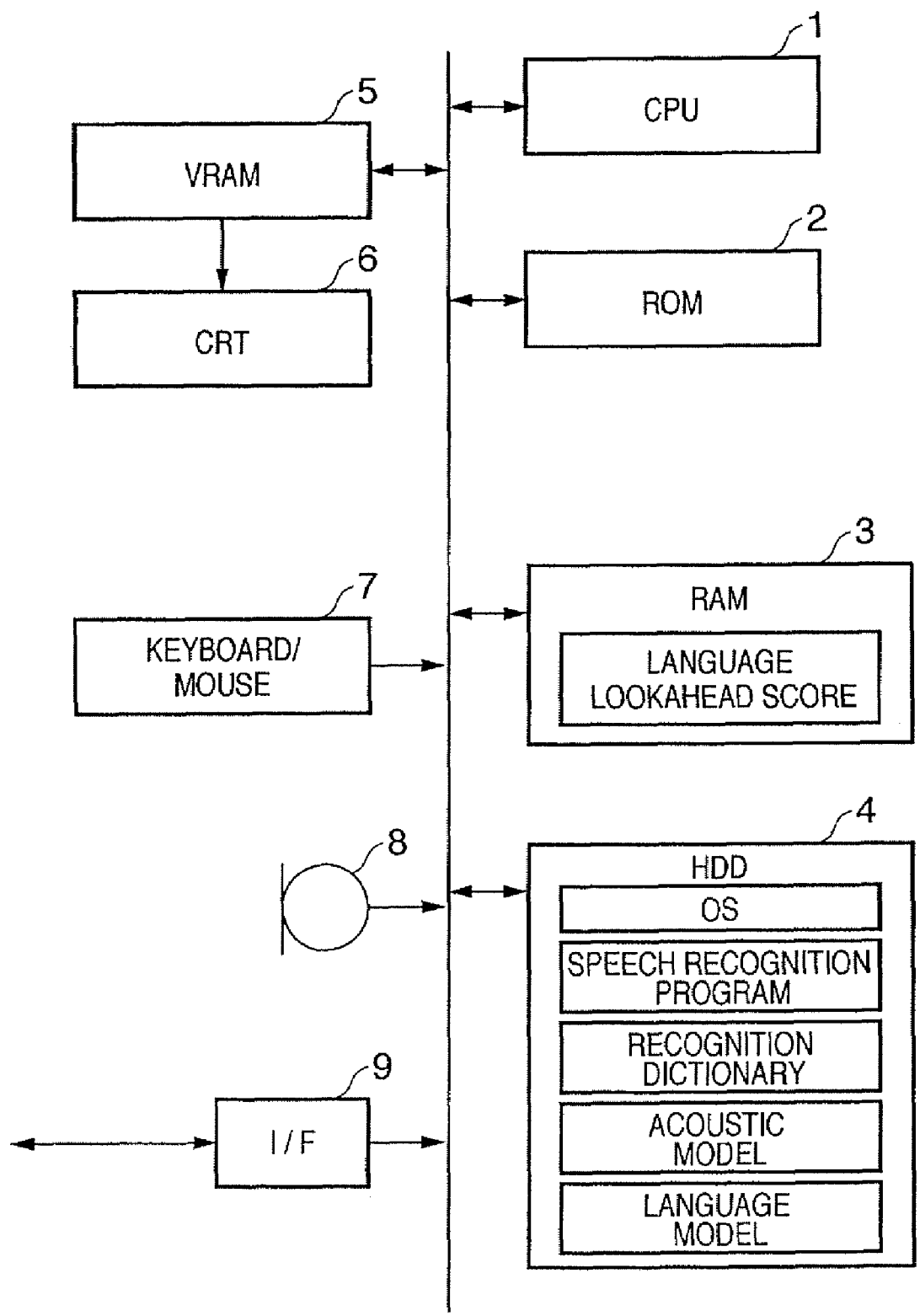
FIG. 1A is a block diagram showing the hardware arrangement of the speech recognition apparatus.

FIG. 1A is a block diagram of the present embodiment showing an example of the hardware configuration of the speech recognition apparatus. The present apparatus can be realized by means of specialized hardware logic, but is typically represented by a computer system that utilizes a CPU, as is shown in the diagram.

This speech recognition apparatus, comprising a CPU 1 controlling the entire apparatus, a ROM 2 storing the boot program or static data, a RAM 3 both functioning as the main memory and providing work area for CPU 1, is configured as follows.

An HDD 4 is a hard disk drive. As shown in FIG. 1A, the HDD 4 stores the Operating System (OS), speech recognition program, recognition dictionary used for speech recognition, acoustic model, and language model.

A VRAM 5 is a memory that renders the image data that is desired to be displayed. By rendering the image data, etc., here, a CRT 6 is used to display. Reference number 7 indicates a keyboard and mouse to enable the setting of various settings. Reference number 8 is a microphone to input speech, 9 is an interface (I/F) to connect to external apparatuses or networks. Audio data either collected using a microphone 8 or received through I/F 9 may be used.

Figure 1B:
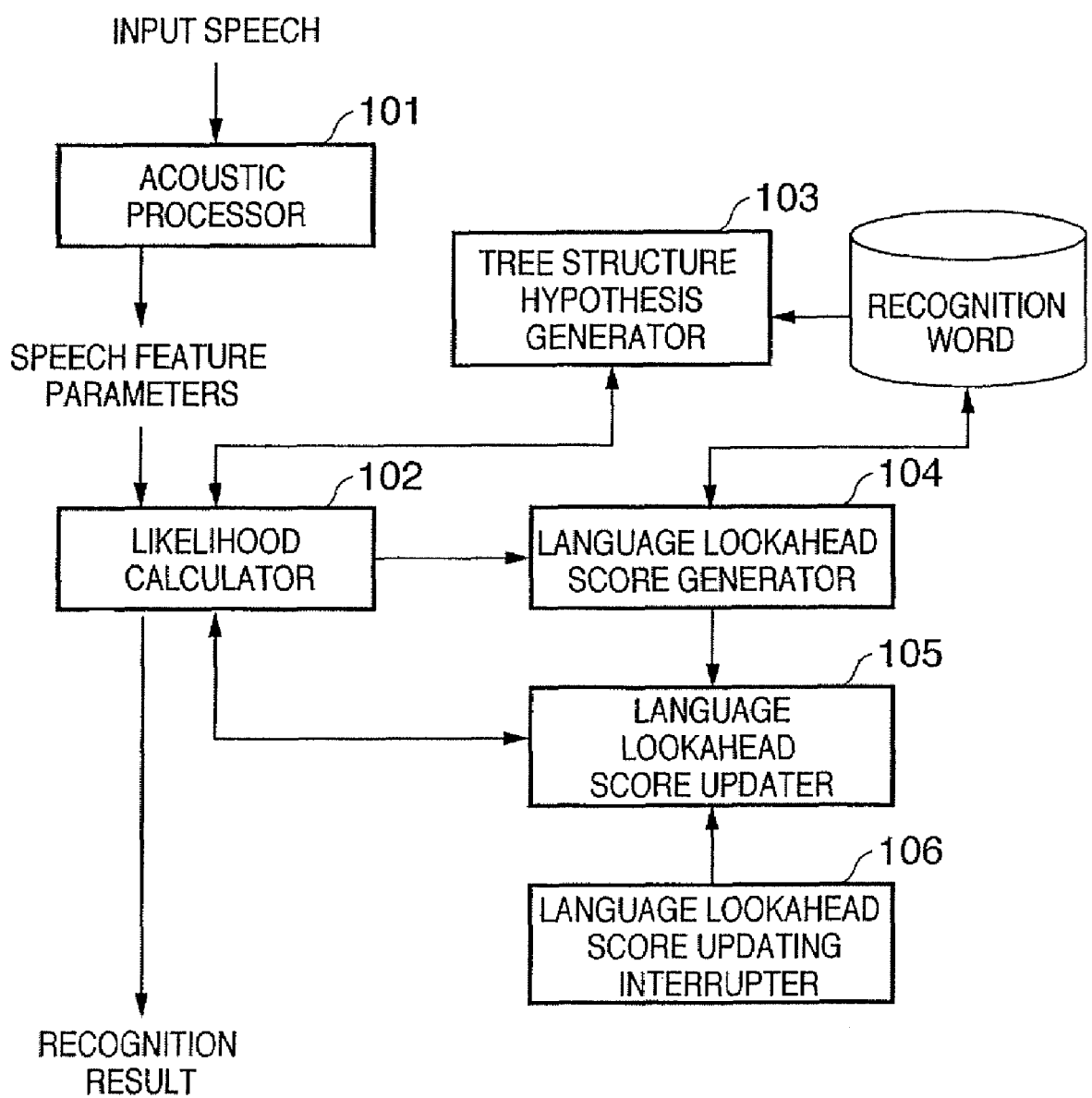
FIG. 1B is a block diagram showing the functional arrangement of the speech recognition apparatus.

FIG. 1B is a block diagram showing the functional configuration of the speech recognition apparatus.

In FIG. 1B, an acoustic processor 101 analyzes input speech and extracts speech feature parameters. A likelihood calculator 102 calculates the acoustic score and the language score by using the speech feature parameters to obtain the likelihood of recognition words. A tree structured hypothesis generator 103 generates the tree structured hypothesis of the hypothesis list composed of recognition words used for likelihood calculation, shared among recognition words, and, e.g., stores it in the RAM 3, as shown in FIG. 1A. A language lookahead score generator 104 obtains the language lookahead score of each hypothesis of the tree structured hypothesis. A language lookahead score updater 105 updates the language lookahead score of the predetermined hypothesis and designates the likelihood. A language lookahead score updating interrupter 106 stops the updating of the language lookahead score of the predetermined hypothesis.

The operation of the speech recognition apparatus will be described as it relates to the preferred embodiment using FIG. 1B.

Upon receiving from the keyboard/mouse 7 the instruction to begin speech recognition, the speech recognition process is begun and speech is input via, e.g., the microphone 8. An acoustic processor 101 divides the input speech into frames of short time lengths, analyzes the speech signal of each frame to extract the speech feature parameters, and sends them to the likelihood calculator 102. The likelihood calculator 102, based on the speech feature parameters and the acoustic model stored in the HDD 4, carries out the likelihood calculations. At this point, the hypothesis of recognition words is generated by the tree structured hypothesis generator 103, and likelihood calculation proceeds as the generated tree structured hypothesis is searched.

Figure 2:
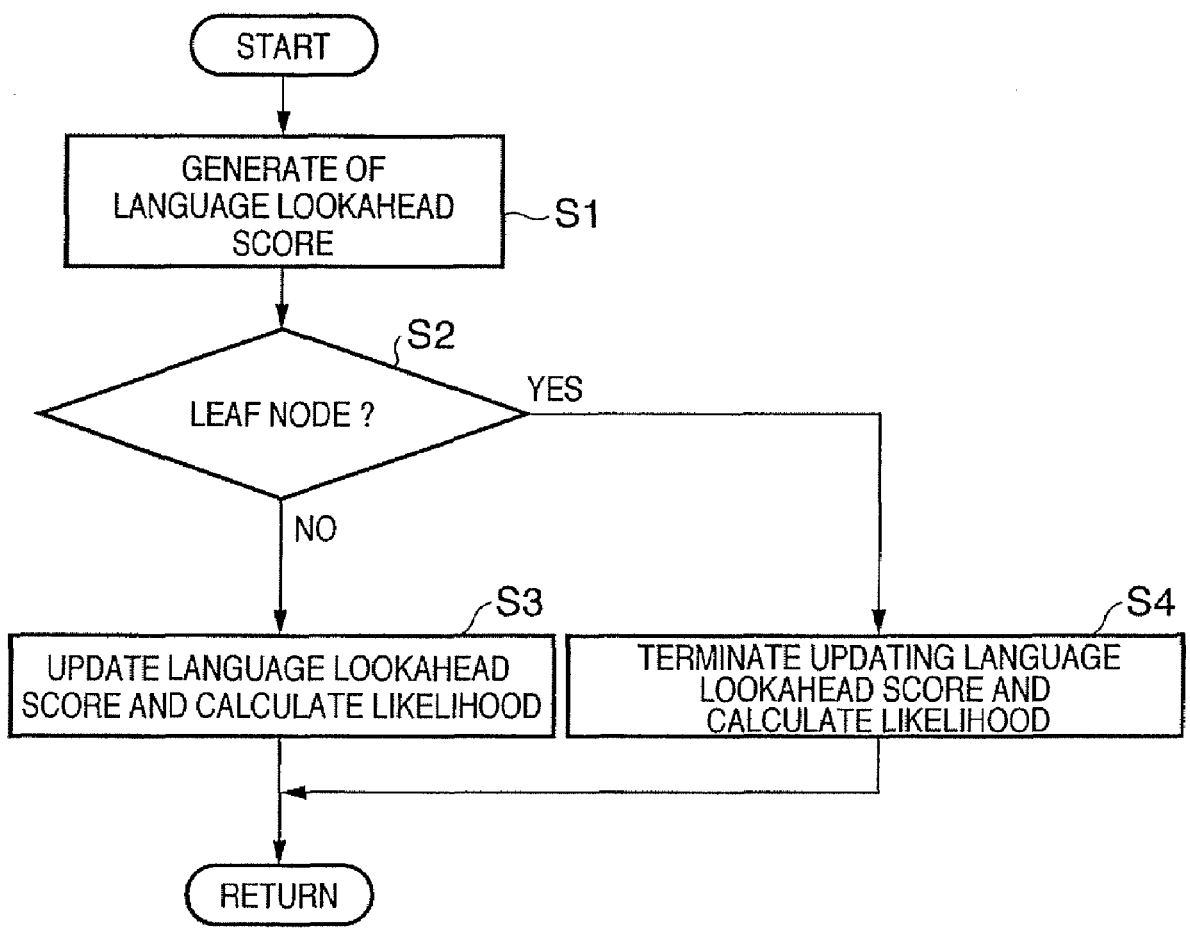
FIG. 2 is a flowchart showing the likelihood calculation process of the speech recognition apparatus.
Figure 3:
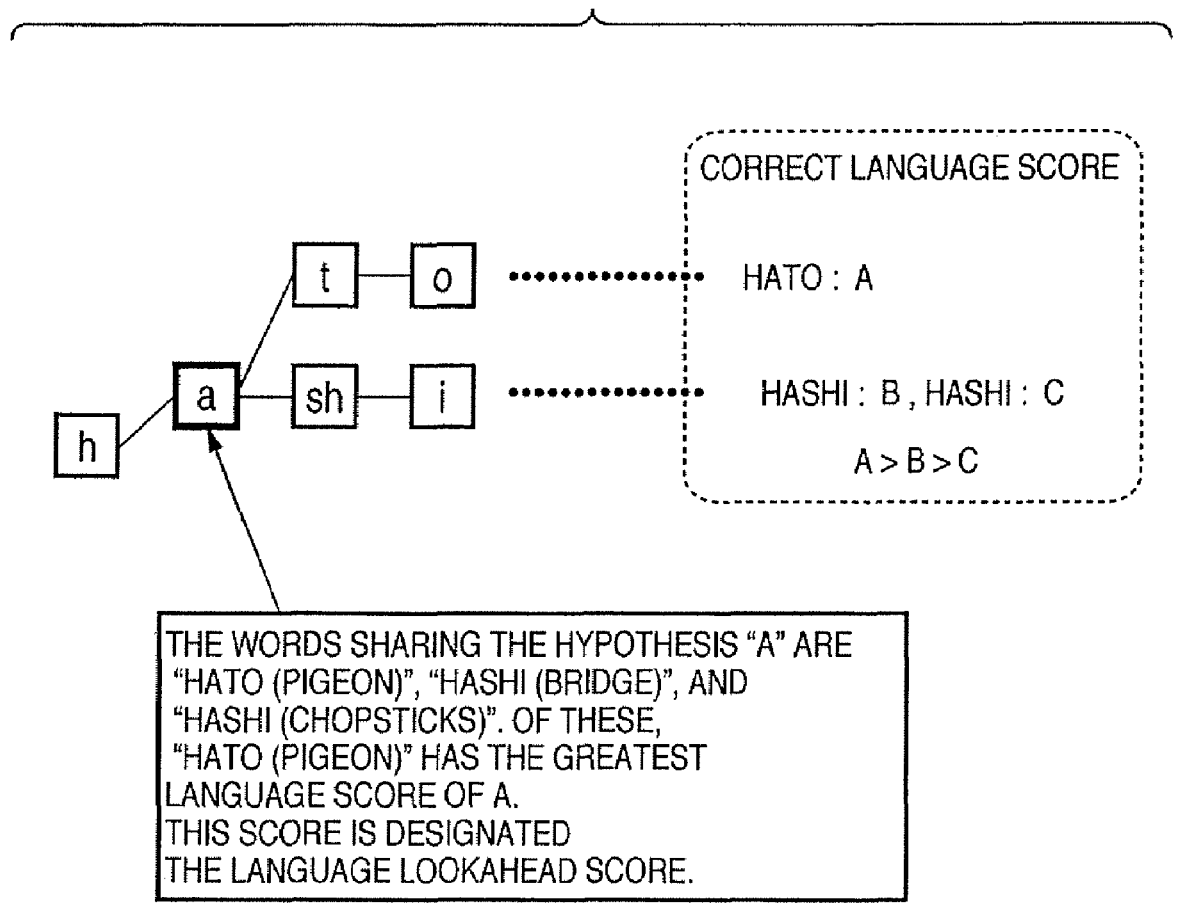
FIG. 3 is a diagram describing the language lookahead score generation process.

FIG. 2 is a flowchart showing an example of the process of likelihood calculation in one embodiment. The language lookahead score generator 104 obtains the language lookahead score of each hypothesis (Step S1). FIG. 3 describes the manner in which the language lookahead score is obtained. In the tree structured dictionary of FIG. 3, the hypothesis "a" indicated by bold line is shared by the recognition words "hato (pigeon)", "hashi (bridge)", and "hashi (chopsticks)". Here, the highest language score for recognition words is used as the language lookahead score of the hypothesis "a". In FIG. 3, the language scores A, B, and C assigned to "hato (pigeon)", "hashi (bridge)", and "hashi (chopsticks)" have the size relationship A>B>C. Therefore, the language lookahead score of hypothesis "a" is deemed to be A, which has the largest value among A, B, and C. Note that, the language lookahead score generator 104 may either obtain the language lookahead score of each hypothesis prior to speech input, or obtain the language lookahead score as needed during the middle of hypothesis searching in likelihood calculation. As a language score, e.g., an N-gram score (the occurrence rate score of an N number of adjacent words) is used. In this case, language scores change depending on the preceding words, so even at the same node the language lookahead scores may differ. As shown in FIG. 1A, the language lookahead score is stored, e.g., in the RAM 3. Alternatively, it may be stored in the HDD 4, not the RAM 3.

Figure 4:
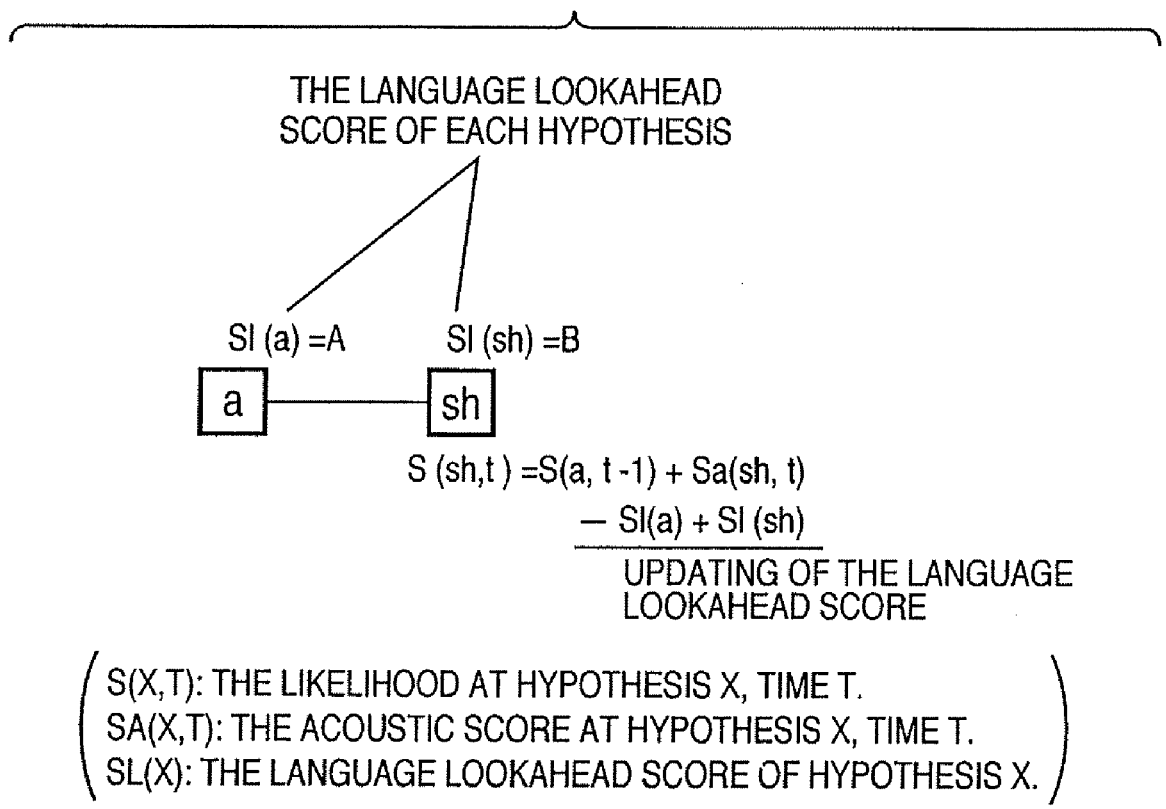
FIG. 4 is a diagram explaining the update process of the language lookahead score.

The language lookahead score updater 105 uses this language lookahead score to update the language lookahead score to reflect the likelihood of each hypothesis, then sends it to the likelihood calculator 102. FIG. 4 is a diagram showing the process of updating the language lookahead score by the language lookahead score updater 105 to reflect the likelihood, during the process of transiting through hypotheses. In FIG. 4, S(a, t−1) reflects the likelihood of hypothesis "a" at time t−1. This likelihood refers to the likelihood of connected hypotheses, calculated from the root node to the node of interest for said hypothesis "a", or, in other words, the cumulative score from the start of utterance. This score already includes the language lookahead score S1($a$) of "a". The likelihood S(sh, t), calculated when transitioning from hypothesis "a" to hypothesis "sh" at time t, is, as shown in FIG. 4, calculated by adding the acoustic score Sa(sh,t) of hypothesis "a" to the likelihood S(a, t−1) of the hypothesis "a" of the parent node. In addition, by subtracting S1($a$), already included in S(a, t−1) of hypothesis "a" of the parent node, and then adding the likelihood lookahead score S1($sh$) of hypothesis "sh", the language lookahead score is updated.

Figure 5:
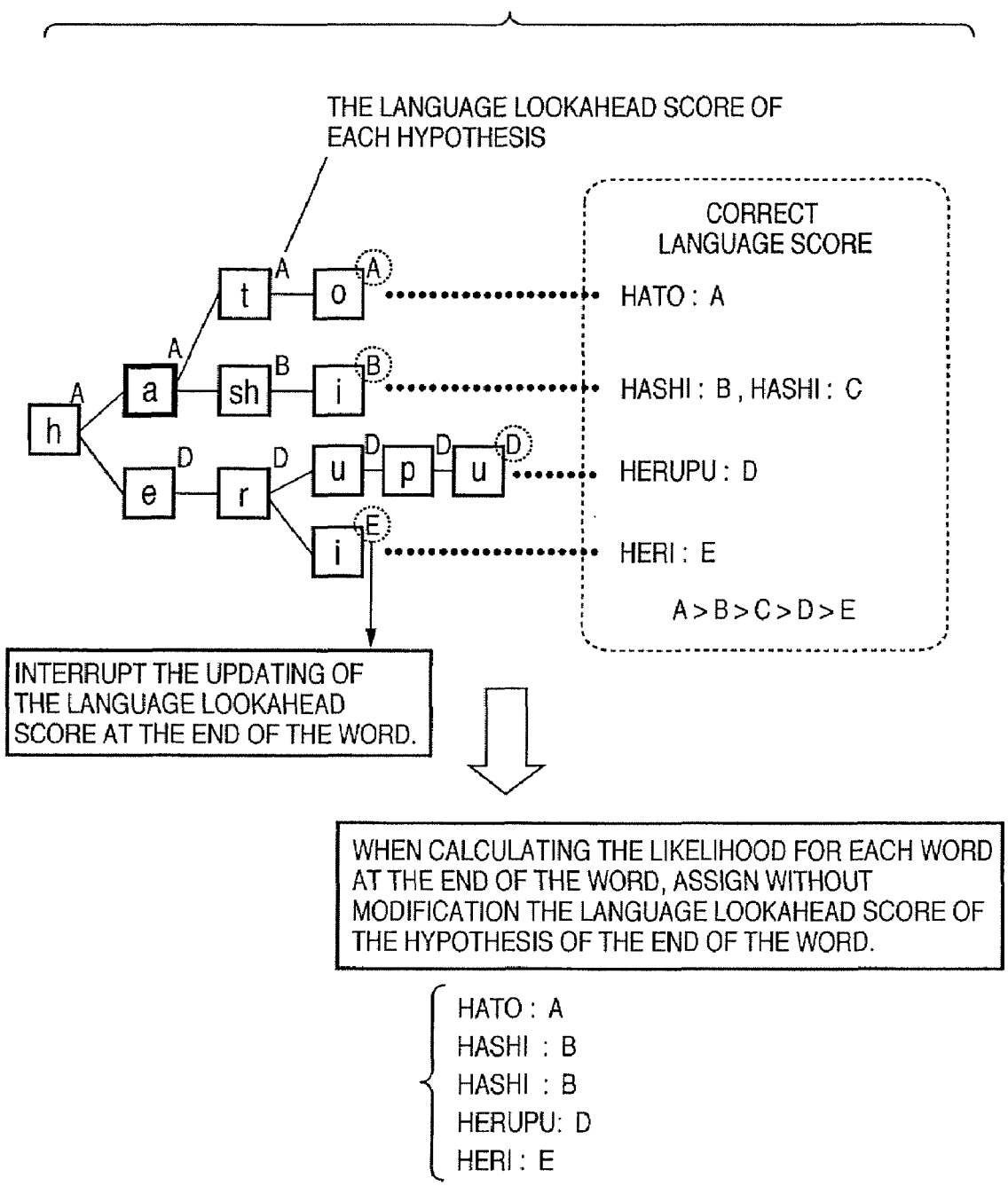
FIG. 5 is a diagram describing an example of interrupting the update of the language lookahead score at the node of the end of the word.

Note that, in this embodiment, the language lookahead score updating interrupter 106 terminates the updating of language lookahead score by language lookahead score updater 105. FIG. 5 shows an example of termination of the updating of language lookahead score at the hypothesis of the end of the word (i.e., the leaf node). To put briefly, during this process, language lookahead score updater 105 updates the language lookahead score at each hypothesis as the likelihood calculator 102 searches the tree structured hypothesis (Step S3). Note that, e.g., it is determined whether the node of interest is at the end of the word (leaf node) (Step S2), and if the node of interest is at the end of the word, the language lookahead score updating interrupter 106 terminates the updating of the language lookahead score (Step S4).

In the example of FIG. 5, the recognition word is defined once transition through the hypothesis of the end of the word is achieved and the tree structure has been passed, and the language score is provided at this point. However, since the updating of the language lookahead score has been terminated, the correct language score is not provided and instead the language lookahead score of the end of the word is used without modification to reflect the likelihood. For example, "hashi (bridge)" and "hashi (chopsticks)" actually possess different language scores, and so conventionally a correct language score would be provided as the hypothesis of the last character of the word is passed and different likelihood scores are output. Conventionally, this type of updating was invariably carried out until the end, giving rise to the problem of buildup of the amount of computation required for language score updating. By contrast, in the present embodiment, as aforementioned, the language lookahead score updating is terminated at the end of the word, so the language lookahead score B of "i", the hypothesis of the end of the word, is coupled-without modification to the likelihood of "hashi (bridge)" and "hashi (chopsticks)". In this manner, in fact, it is fully possible to add language restrictions against the likelihood calculation at the point of language lookahead score of the hypothesis farther in from the start of the word, and it is also possible to delete unnecessary hypotheses in consideration of the language score. In addition, there is known a method (called two-pass decoding) of first carrying out likelihood calculation using a course acoustic model/language model, and then to re-calculate the likelihood using a high-precision acoustic model/language model to the narrowed down hypotheses. When using this two-pass decoding method, even if an accurate language score is not used at the time of initial calculation, it is possible to recalculate using a correct, more detailed language score later on.

As detailed above, the preferred embodiment of the present invention was explained, but a variety of modifications are possible.

Figure 6:
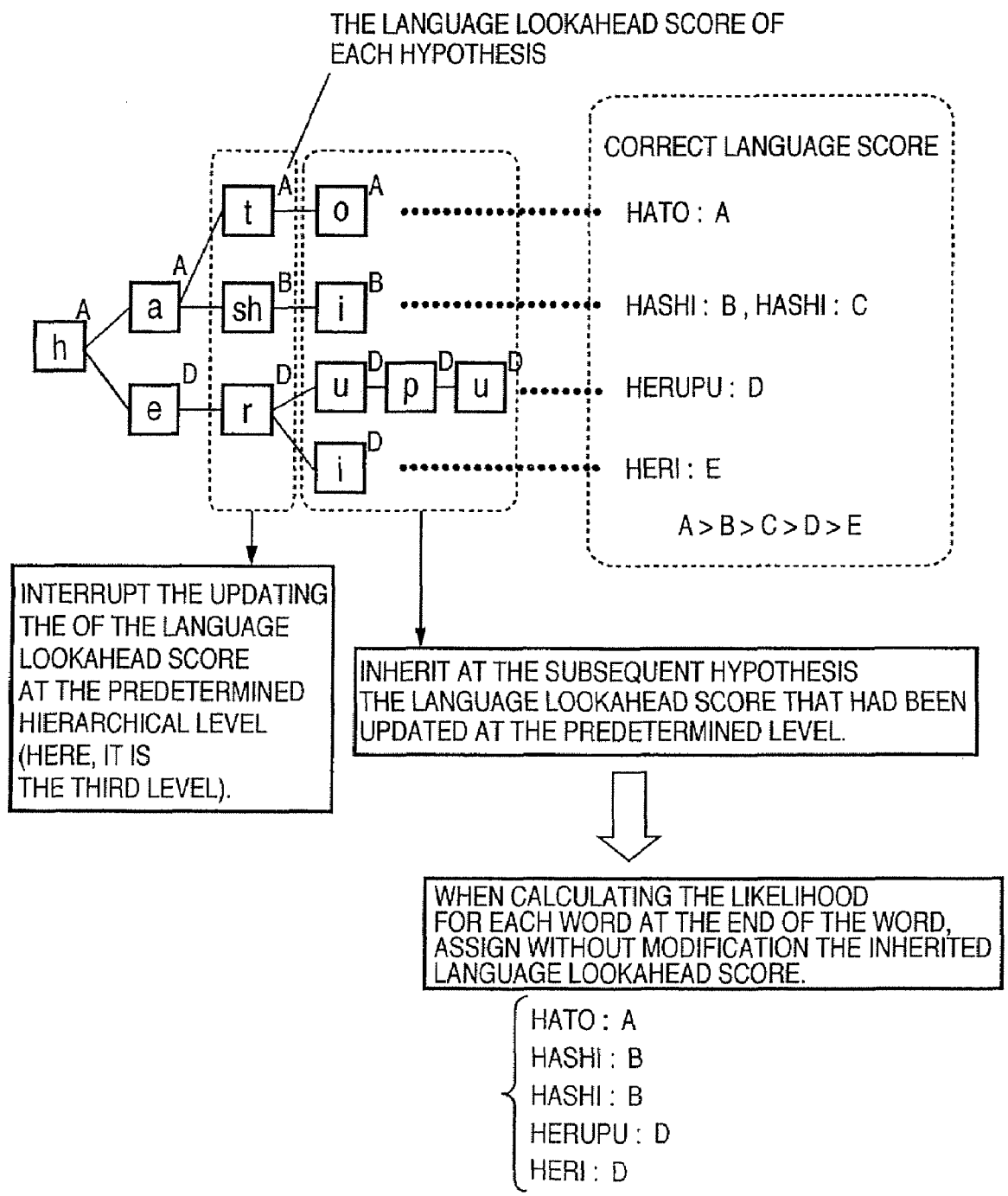
FIG. 6 is a diagram describing an example of interrupting the update of the language lookahead score at a specific layer.
Figure 7A:
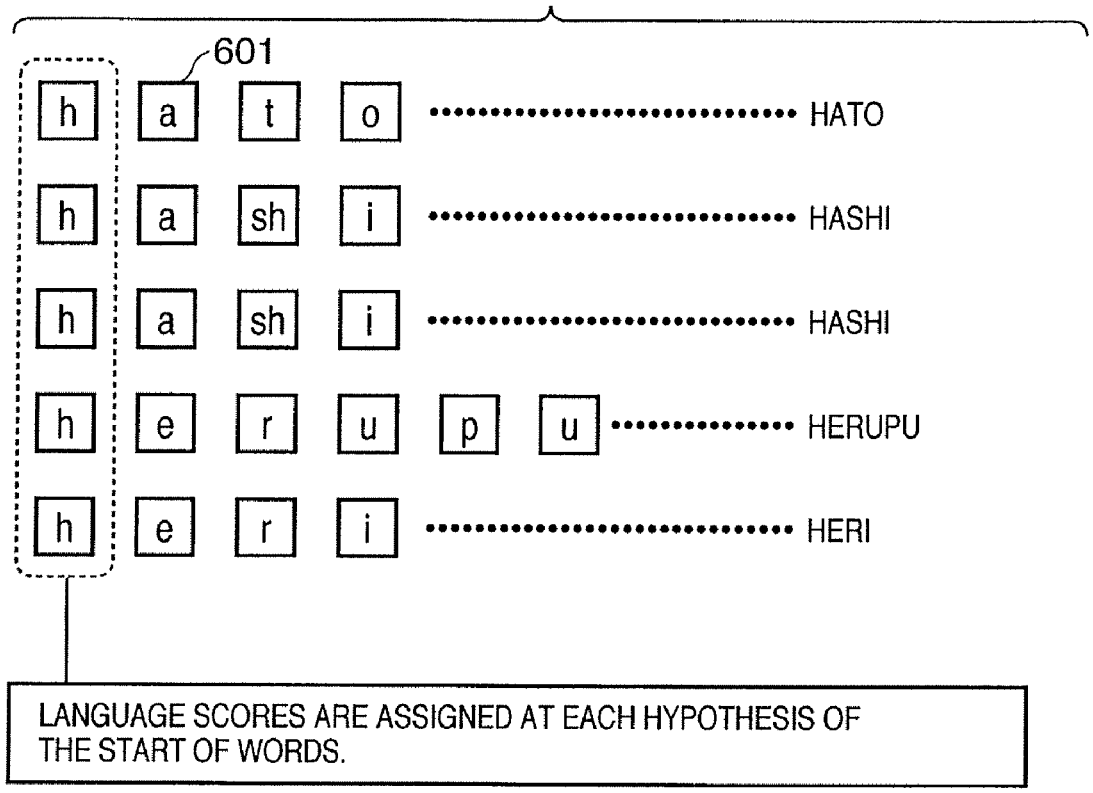
FIG. 7A is a diagram showing an example of a hypothesis that is generated at each existing word.
Figure 7B:
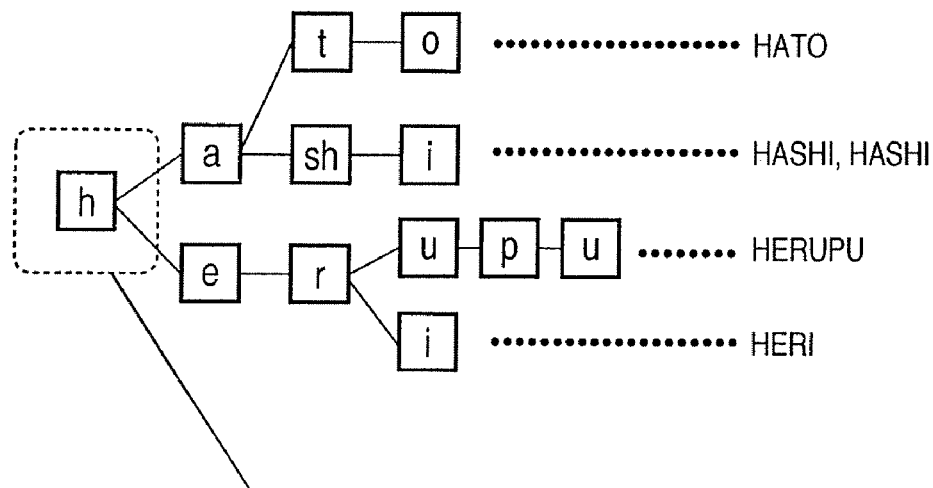
FIG. 7B is a diagram showing an example of a tree structured hypothesis shared among a plurality of existing words.
Figure 8:
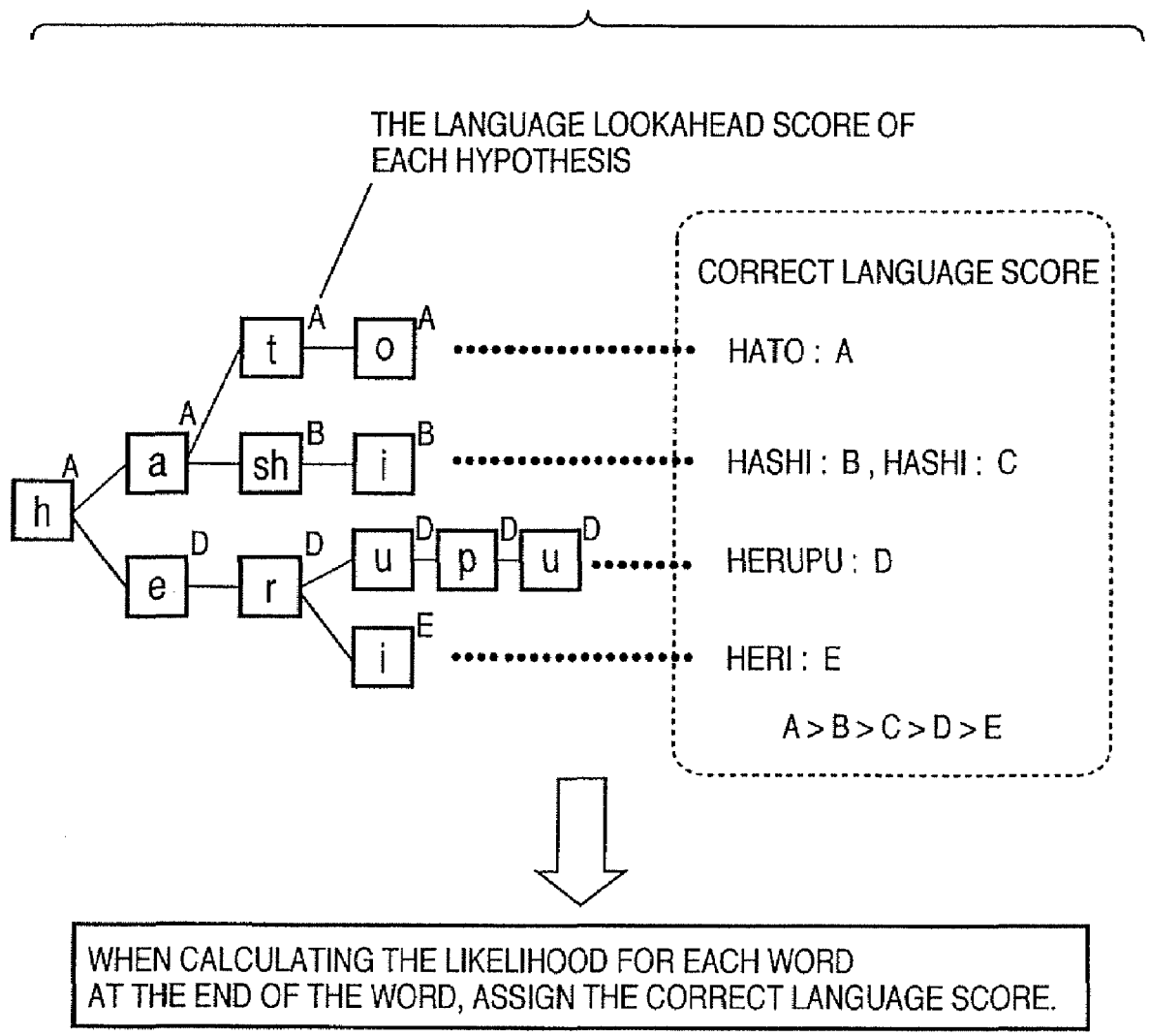
FIG. 8 is a diagram explaining a conventional likelihood lookahead scoring method of speech recognition.

For example, the position at which the language lookahead score updating interrupter 106 stops updating the language lookahead score is not limited to the end of the word (leaf node). For example, as shown in FIG. 6, it is permitted to stop the updating of the language lookahead score at the pre-determined hierarchical level (the third hierarchical level in FIG. 6) in the tree structured hypothesis, and then inherit as is the language lookahead score of the hypothesis corresponding to the parent node of the succeeding hypothesis. Then, at the point of likelihood calculation of the end of each word, there is no updating to the correct language score, but instead the inherited language lookahead score is used without change. Therefore, in FIG. 6, as to "hashi (bridge)" and "hashi (chopsticks)", which occupies the same hypotheses in the tree structured hypothesis, the language lookahead score B is added to the likelihood. Likewise, as to "herupu (help)" and "heri (helicopter)", which occur at the diverging point of the hypothesis after the third hierarchical level, the language lookahead score D is added to the likelihood.

Moreover, in the above embodiment, the largest language lookahead score among language scores for recognition words that share a hypothesis was used, but instead of that, e.g., it is possible to use the average-value or the mid-value of the language scores of recognition words shared the hypothesis.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-360838, filed Dec. 14, 2005, which is hereby incorporated by reference herein in its entirety.

What is claimed is:

1. A speech recognition apparatus using a tree structured hypothesis having nodes each corresponding to a part of a recognition word, the apparatus adapted to calculate a likelihood of connected hypotheses expressed by a pass from a root node to a node of interest using acoustic and language scores, comprising:
 a language lookahead score generating unit configured to generate a language lookahead score for a node of interest based on the language score of each recognition word sharing the node of interest;
 an addition unit configured to add the acoustic score of the node of interest to the likelihood of connected hypotheses expressed by a path from the root node to a parent node of the node of interest;
 an updating unit configured to update the language lookahead score by deleting the language lookahead score when the parent node was the node of interest, and by adding the language lookahead score of the node of interest generated by said language lookahead score generating unit; and
 an updating interrupt unit configured to interrupt the updating of the language lookahead score by said updating unit, in accordance with the position of the node of interest in the tree structured hypothesis.

2. The speech recognition apparatus according to claim 1, wherein said updating interrupt unit interrupts the updating of the language lookahead score by said updating unit, if the node of interest is a leaf node.

3. The speech recognition apparatus according to claim 1, wherein said updating interrupt unit interrupts the updating of the language lookahead score by the said updating unit, when the node of interest reaches a predetermined number of the depth of the hierarchy of the tree structured hypothesis.

4. The speech recognition apparatus according to claim 2, wherein the said language lookahead score generating unit determines as the language lookahead score the greatest language score out of all the language scores of each recognition word sharing the node of interest.

5. A speech recognition method in a speech recognition apparatus using a tree structured hypothesis having nodes each corresponding to a part of a recognition word, the apparatus adapted to calculate a likelihood of connected hypotheses expressed by a pass from a root node to a node of interest using acoustic and language scores, the method comprising the steps of:
 generating a language lookahead score for a node of interest based on the language score of each recognition word sharing the node of interest;
 adding the acoustic score of the node of interest to the likelihood of connected hypotheses expressed by a path from the root node to a parent node of the node of interest;
 updating the language lookahead score by deleting the language lookahead score when the parent node was the node of interest, and by adding the language lookahead score of the node of interest generated in said generation step; and
 interrupting the updating of the language lookahead score in said updating step, in accordance with the position of the node of interest in the tree structured hypothesis.

6. A computer program stored on a computer-readable medium for making a computer execute the speech recognition method using a tree structured hypothesis having nodes each corresponding to a part of a recognition word, the computer to calculate a likelihood of connected hypotheses expressed by a pass from a root node to a node of interest using acoustic and language scores, the program comprising code for performing the following steps:
 generating a language lookahead score for a node of interest based on the language score of each recognition word sharing the node of interest;
 adding the acoustic score of the node of interest to the likelihood of connected hypotheses expressed by a path from the root node to a parent node of the node of interest;
 updating the language lookahead score by deleting the language lookahead score when the parent node was the node of interest, and by adding the language lookahead score of the node of interest generated in said generation step; and
 interrupting the updating of the language lookahead score in said updating step, in accordance with the position of the node of interest in the tree structured hypothesis.

* * * * *